(12) United States Patent
Ober et al.

(10) Patent No.: US 8,447,296 B2
(45) Date of Patent: May 21, 2013

(54) METHODS FOR TESTING MULTIBEAM SATELLITE SYSTEMS USING INPUT POWER TELEMETRY AND OUTPUT NOISE POWER

(75) Inventors: Susan Ober, Mountain View, CA (US); David Gonzalez, Santa Clara, CA (US)

(73) Assignee: Space Systems/Loral, Inc., Palo Alto, CA (US)

( * ) Notice: Subject to any disclaimer, the term of this patent is extended or adjusted under 35 U.S.C. 154(b) by 0 days.

(21) Appl. No.: 13/385,619

(22) Filed: Feb. 27, 2012

(65) Prior Publication Data

US 2012/0202417 A1    Aug. 9, 2012

Related U.S. Application Data

(62) Division of application No. 09/912,167, filed on Jul. 23, 2001, now Pat. No. 8,160,575.

(51) Int. Cl.
*H04W 84/06* (2009.01)
*H04W 4/00* (2009.01)

(52) U.S. Cl.
USPC ....... 455/427; 455/13.4; 455/12.1; 455/452.1

(58) Field of Classification Search
USPC .............. 455/427, 429, 12.1, 13.3, 452.1, 455/430, 452.2, 13.1, 63.1, 13.4, 13.2
See application file for complete search history.

(56) References Cited

U.S. PATENT DOCUMENTS

| | | | | |
|---|---|---|---|---|
| 6,157,817 A | * | 12/2000 | Norin et al. | 455/67.11 |
| 6,233,433 B1 | * | 5/2001 | Norin | 455/67.14 |

* cited by examiner

*Primary Examiner* — John J Lee
(74) *Attorney, Agent, or Firm* — Kenneth W. Float

(57) ABSTRACT

Methods that test multibeam satellite communication systems, including its antennas and transponders. The methods use input power telemetry and output noise power to test satellite transponders and antennas while the satellite is in orbit. One method that tests a satellite receive antenna employs at least two earth stations, one for RF testing and one for telemetry and commanding, with each providing a backup for the other. Other methods may use one or more earth stations to perform testing. Methods are disclosed that generate receive antenna pattern measurements, transmit pattern measurements, input chain frequency response curves, input chain transfer curves, and output chain frequency response curves.

6 Claims, 6 Drawing Sheets

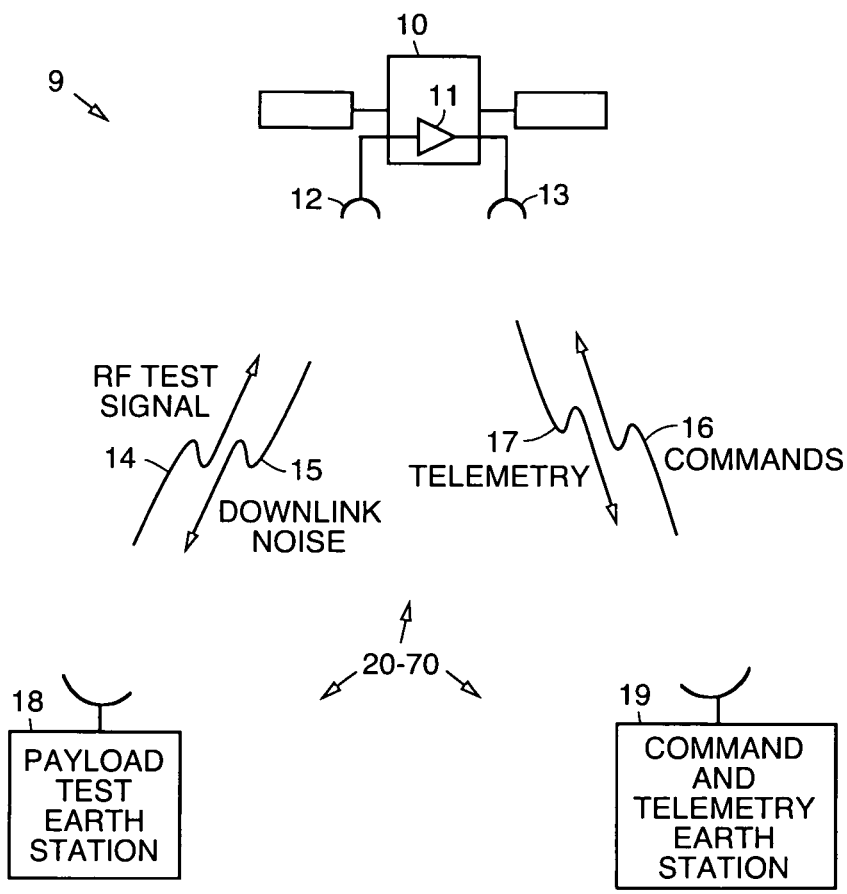

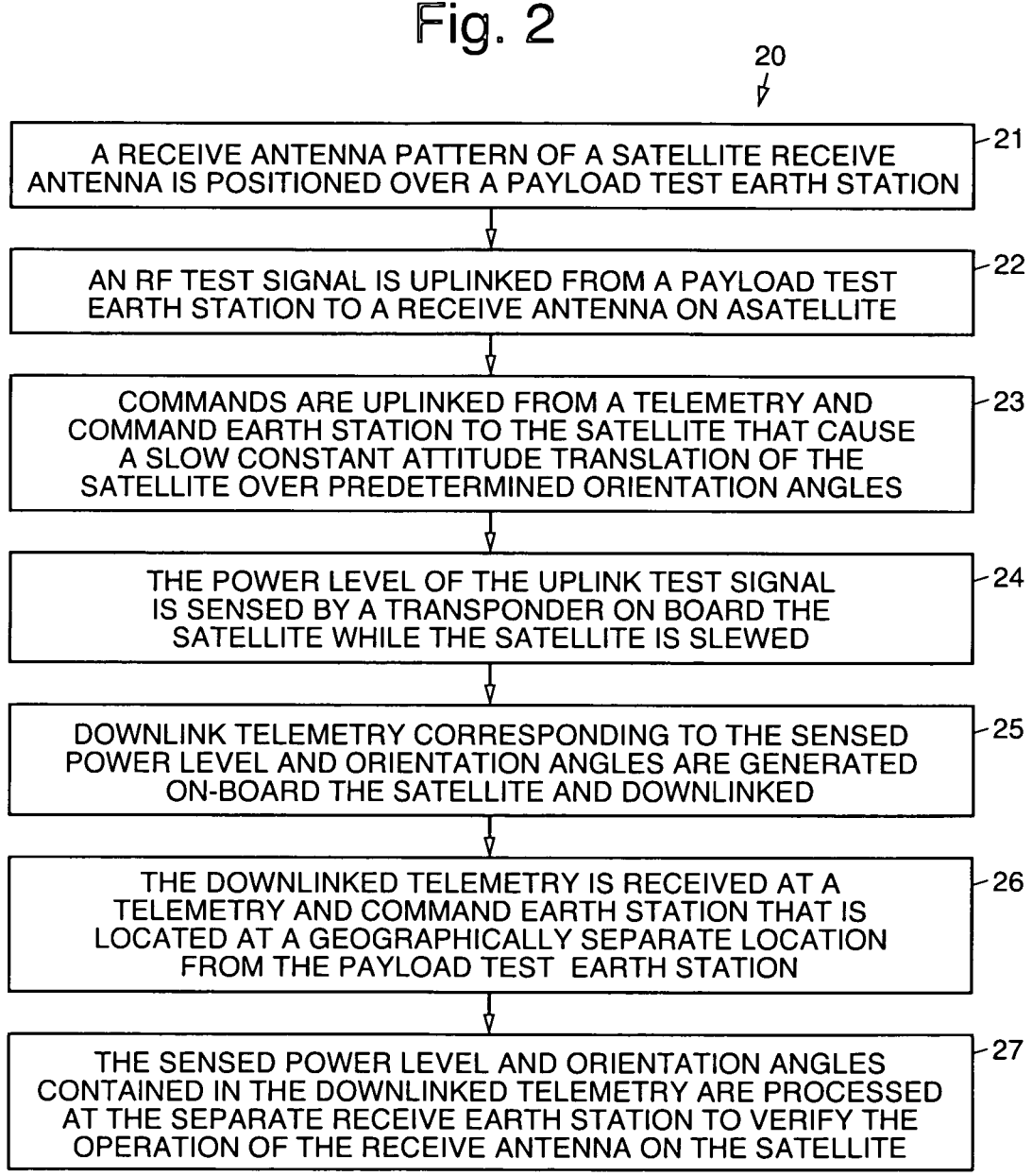

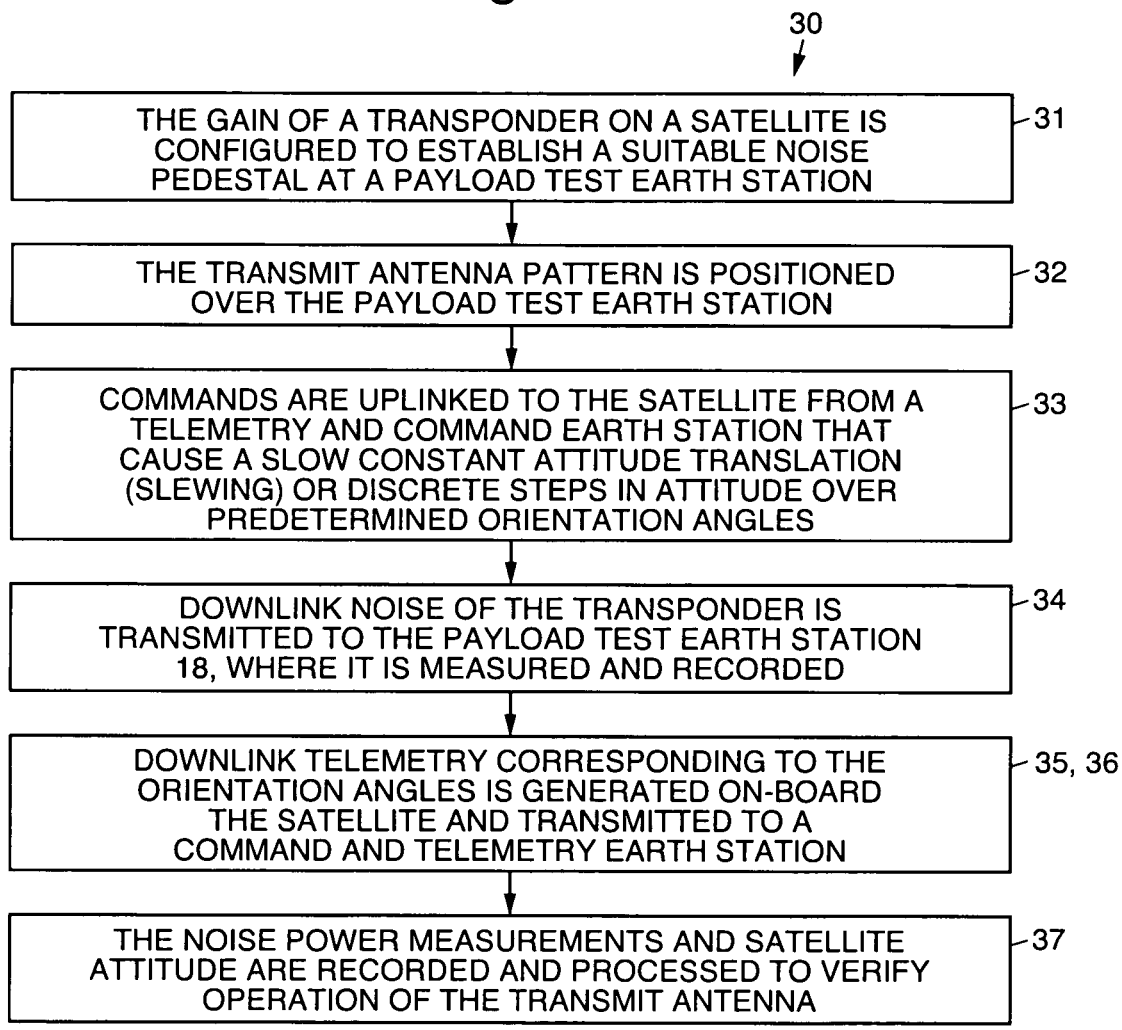

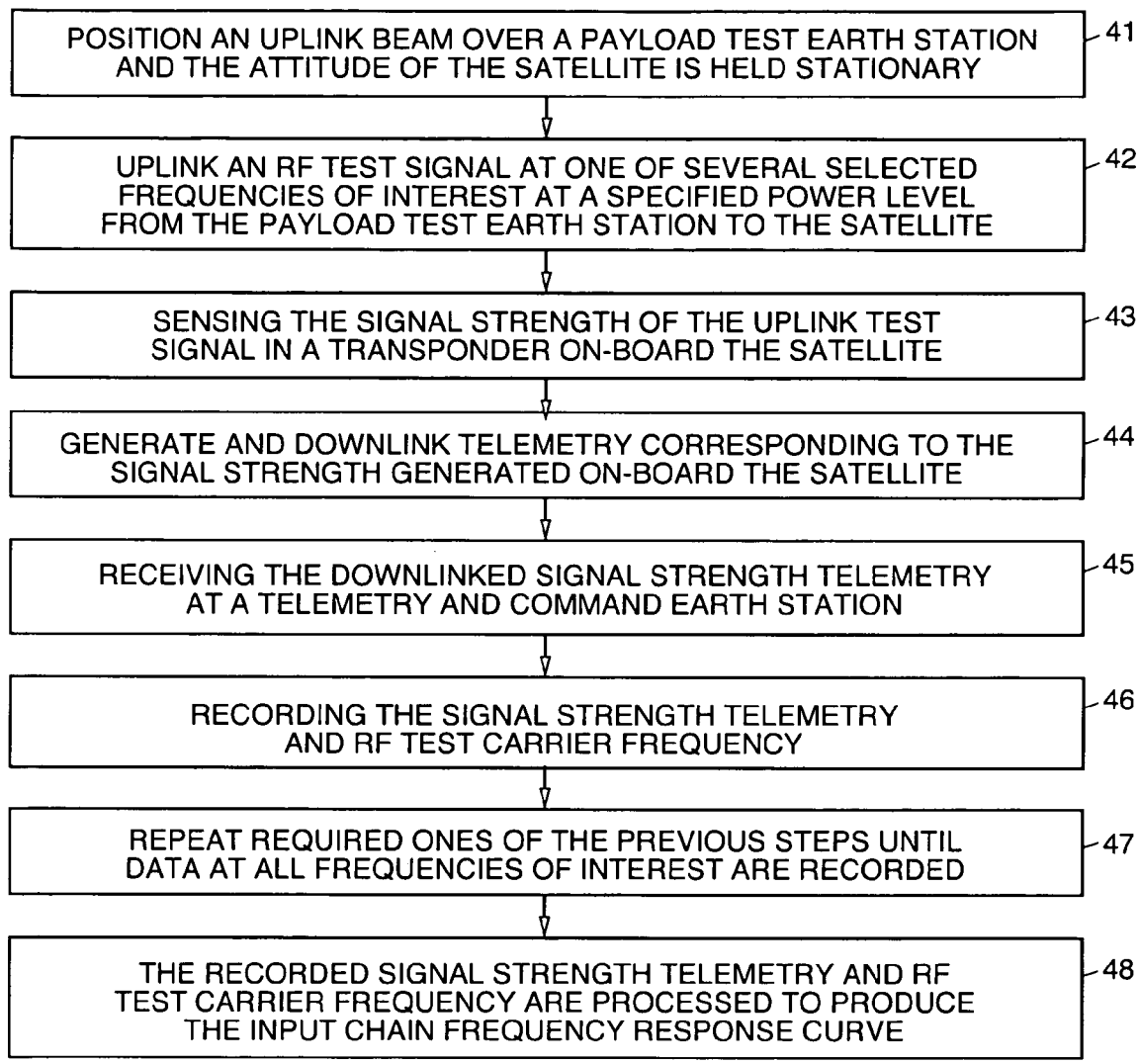

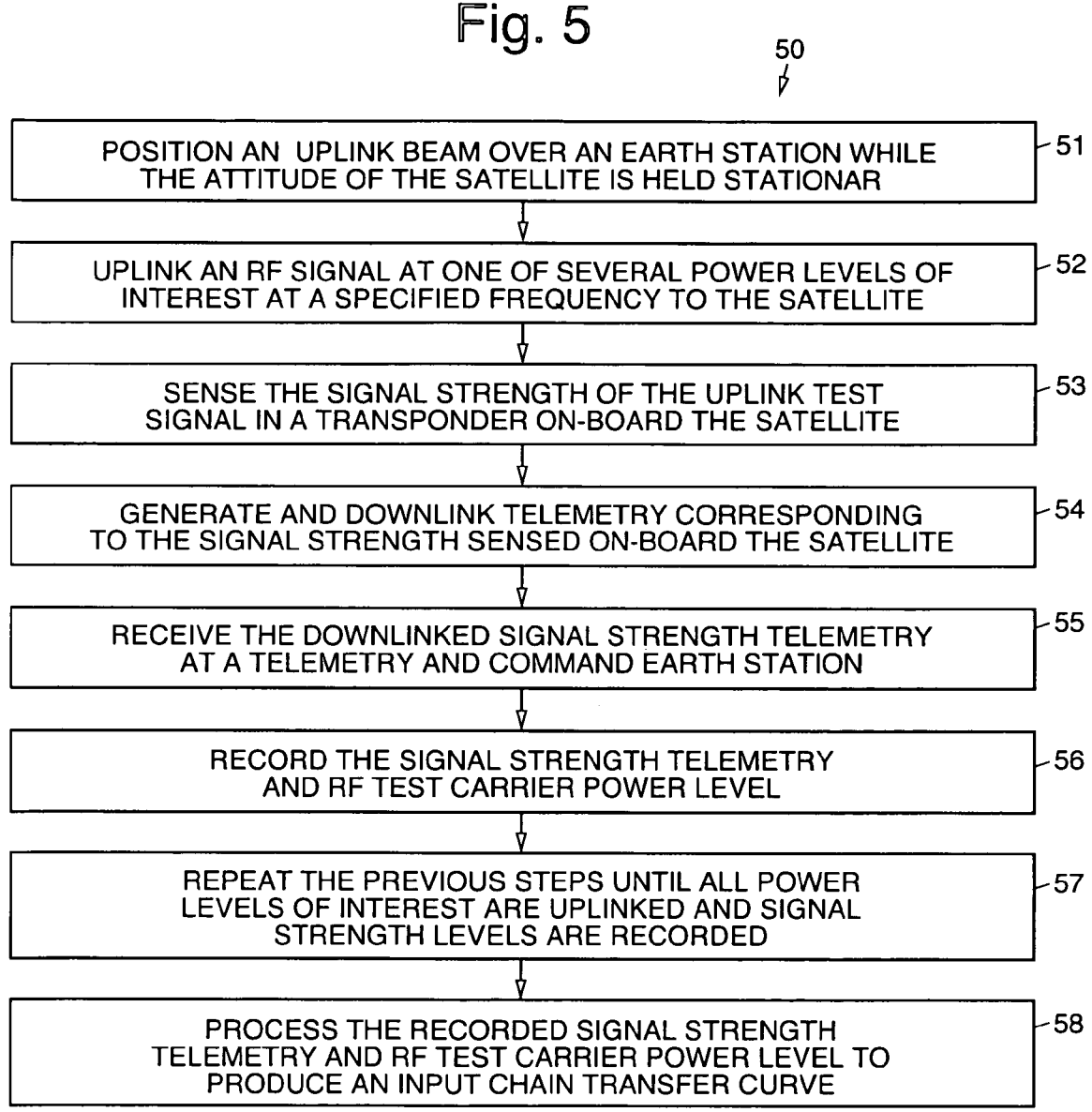

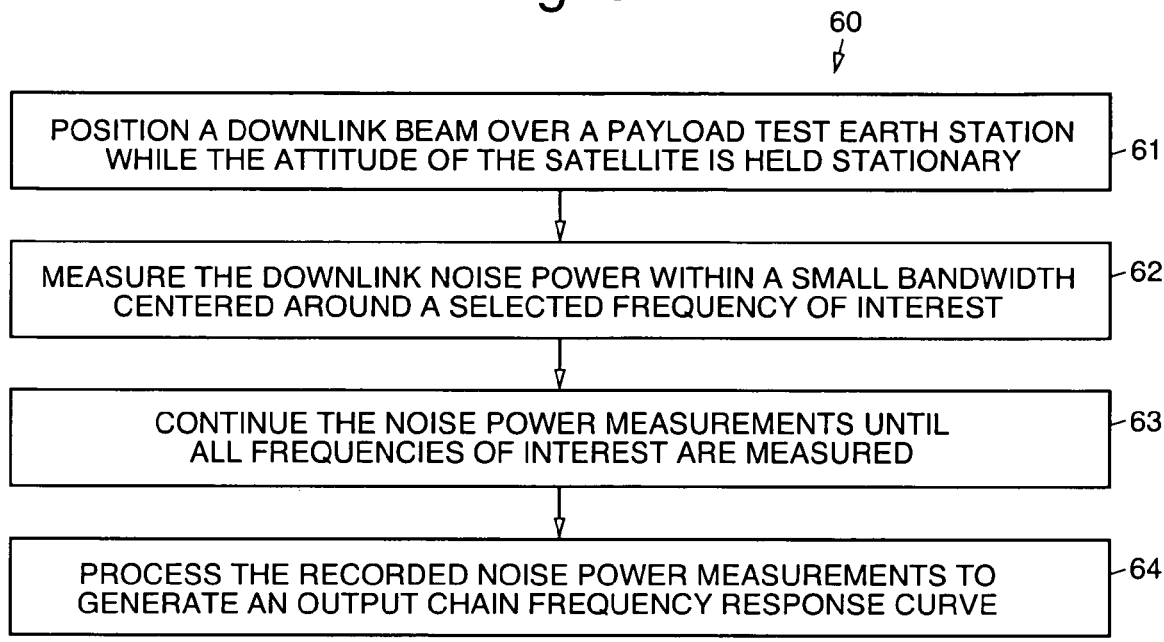
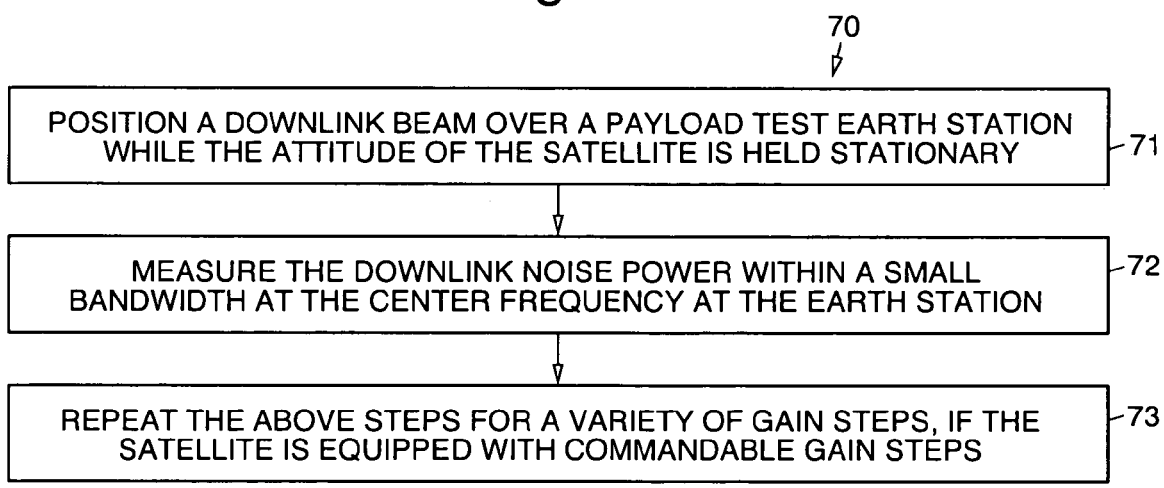

METHODS FOR TESTING MULTIBEAM SATELLITE SYSTEMS USING INPUT POWER TELEMETRY AND OUTPUT NOISE POWER

CROSS REFERENCE TO RELATED APPLICATION

This application is a divisional of U.S. patent application Ser. No. 09/912,167, filed Jul. 23, 2001, now U.S. Pat. No. 8,160,575, issued Apr. 17, 2012.

BACKGROUND

The present invention relates generally to satellite communication systems, and more specifically, to methods for testing multibeam satellite communication systems in orbit using input power telemetry and output noise power.

The assignee of the present invention manufactures and deploys satellites carrying communication systems into geosynchronous and low earth orbits. Certain coverage patterns provided by communication systems produce many small spot beams. In many cases, the receive pattern and the transmit pattern are not over the same geographical location on the earth. Therefore, many payload test earth stations are required for payload testing while the satellite is in orbit.

In general, in-orbit testing of a satellite includes verifying the health of transponders and verifying the pointing and shape of the antenna patterns. Typically, these tests are end-to-end and require an earth station to provide an uplink and an earth station to receive and analyze the downlink signal. If the satellite's transmit and receive antenna patterns do not cover the same geographical location, two or more earth stations are required.

For satellites whose receive and transmit footprints cover essentially the same geographical area, (or if there are two earth stations, one in the receive and one in the transmit pattern), the antenna pattern verification is conducted by performing RF measurements while maneuvering the satellite through a set of attitude maneuvers. Saturated flux density (SFD) and Effective Isotropic Radiated Power (EIRP) at saturation are recorded along with satellite attitude telemetry, then analyzed, to determine the receive pattern and the transmit pattern. This method requires an uplink from an earth station and downlink reception at an earth station. This method is used throughout the industry.

For satellites whose receive and transmit footprints cover essentially the same geographical area (or if there are two earth stations, one in the receive and one in the transmit pattern), the health of the transponders is verified by executing transponder tests such as SFD/EIRP, power input versus power output, frequency response, etc. These test also require an uplink from an earth station and downlink reception at an earth station. This method is used throughout the industry.

For satellites that do not have an earth station in both the receive and transmit patterns, there are two known methods that achieve receive antenna pattern measurements in-orbit. One of these methods is used to measure receive antenna patterns of NSTARa and NSTARb satellites deployed by the assignee of the present invention, and the other is a method disclosed in U.S. Pat. No. 6,157,817. There is currently no method to achieve transmit antenna patterns for satellites unless both receive and transmit footprints are covered by earth stations. There is also no currently-available method to evaluate transponder health unless both receive and transmit footprints are covered by earth stations.

The NSTAR antenna pattern measurement method verifies a receive antenna pattern by recording signal strength telemetry resulting from an RF uplink at discrete attitude positions. The satellite attitude is commanded to a specified attitude position, an RF uplink test carrier is applied, the signal strength telemetry from an on board power sensing device is recorded, the uplink is removed, then the satellite attitude is commanded to the next attitude position. These steps are repeated until sufficient data is taken to analyze the RF pattern. The earth station that provides the RF test uplink is a geographically separate earth station from the earth station that provides command and telemetry.

In method disclosed in U.S. Pat. No. 6,157,817, the same earth station provides the RF test uplink and receives the telemetry. This presents a risk to the mission in the event the earth station becomes inoperable.

It would be desirable to have the capability of testing both the transponders and antenna patterns of a satellite-based communication systems without the requirement of having an earth station in both the receive and transmit footprints. This would allow for testing of the antenna patterns and transponders of multibeam satellites with a minimum number of earth stations. Accordingly, it is an objective of the present invention to provide for improved methods of testing multibeam satellite communication systems with a minimum of earth stations using input power telemetry and output noise power.

SUMMARY OF THE INVENTION

To accomplish the above and other objectives, the present invention provides for methods for testing multibeam satellite communication systems, including antennas and transponders. The methods use input power telemetry and output noise power to test satellite transponders and antennas while the satellite is in orbit. One of the methods employs at least two earth stations, one for RF testing and one for telemetry and commanding, with the RF test earth station providing a backup for the telemetry and commanding earth station. The other methods may use one or more earth stations to perform testing.

A first exemplary method that generates receive antenna pattern measurements comprises the following steps. The satellite attitude is positioned so the starting orientation angle of the slew for the uplink beam under test is over the payload test earth station providing the RF test uplink. Typically, the edge of the uplink beam pattern is chosen as the start point for the subsequent slew. A test signal is uplinked from the earth station to a receive antenna on the satellite. Commands are uplinked from a second earth station that cause the satellite to perform a slow constant attitude translation (stewing) over predetermined orientation angles. The power level of the uplink test signal is sensed while the satellite is slewed. Downlink telemetry corresponding to the sensed power level and orientation angles are generated and transmitted to a second ground station that is located at a geographically distinct location from the first earth station. The sensed power level and orientation angles contained in the downlinked telemetry are processed and analyzed to verify the operation of the receive antenna.

The first exemplary method uses more than one earth station to perform receive antenna pattern measurements, compared to the use of a single earth station disclosed in U.S. Pat. No. 6,157,817. The improvement provided by the present invention over the NSTAR method is that, instead of commanding discrete attitude steps to perform receive antenna pattern measurements, the present method commands a slow, continuous, constant attitude sweep. This allows for more data points to be taken, and reduces the time for the sweep.

Slewing of the satellite is faster than the stop and measure technique used to test NSTAR satellites.

A second exemplary method uses a single earth station to generate transmit antenna pattern measurements without using an uplink carrier. The second exemplary method comprises the following steps. The satellite attitude is positioned so the start orientation angle of the slew for the downlink beam under test is over the payload test earth station receiving the downlink noise. Typically, the edge of the downlink beam pattern is chosen as the start point for the subsequent slew. Commands are uplinked from an earth station that causes the satellite to perform a slow constant attitude translation over predetermined orientation angles. Downlink noise power of a transponder is received at the earth station and measured in a specified bandwidth while the satellite is slewed. Downlink telemetry corresponding to the orientation angles are generated and transmitted to the earth station. The measured noise power levels and orientation angles contained in the downlink telemetry are processed and analyzed to verify the operation of the transmit antenna.

A third exemplary method generates an input chain frequency response curve that serves to verify the frequency characteristics of the transponder equipment up to the signal strength telemetry monitoring circuit. This method comprises the following steps. The uplink beam corresponding to the transponder equipment under test is positioned over a payload test earth station. RF signals at selected frequencies having the same power level are uplinked from the earth station to the satellite. Downlink telemetry corresponding to the signal strength is generated and transmitted to the earth station. The signal strength telemetry, earth station uplink power and frequency are recorded and processed produce the input chain frequency response curve.

A fourth exemplary method generates an input chain transfer curve that serves to verify the power characteristics of the transponder equipment up to the signal strength telemetry monitoring circuit. This method comprises the following steps. The uplink beam corresponding to the transponder equipment under test is positioned over a payload test earth station. RF signals at selected power levels having the same frequency are uplinked from the earth station to the satellite. Downlink telemetry corresponding to the signal strength is generated and transmitted to the payload test earth station. The signal strength telemetry and earth station uplink power is recorded and processed to produce the input chain transfer curve.

A fifth exemplary method that generates an output chain frequency response curve that serves to verify the frequency characteristics of the entire transponder if the transponder is in a linear gain mode or from the output of an amplifier (TWTA) to the downlink antenna if the transponder is in automatic level control mode. This method comprises the following steps. A downlink beam is positioned over an earth station. The noise power within a small bandwidth centered around a selected one of a plurality of frequencies of interest is measured at an earth station. The noise power measurements are continued until the noise power at all frequencies of interest are measured. The recorded noise power measurements are processed to generate an output chain frequency response curve.

A sixth exemplary method that verifies the gain of the transponder comprises the following steps. A downlink beam is positioned over an earth station. The noise power over a small bandwidth at center frequency or other frequency of interest is measured at an earth station. The noise power measurements are made in both linear mode and automatic level control mode at a variety of gain/level steps, if the satellite is equipped with commandable gain/level steps. The recorded noise power measurements are processed to generate gain characteristics of the transponder.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 1 illustrates an exemplary system in which methods in accordance with the principles of the present invention are employed; and FIGS. 2-7 are flow diagrams that illustrate exemplary methods in accordance with the principles of the present invention for use with the system shown in FIG. 1.

DETAILED DESCRIPTION

Referring to the drawing figures, FIG. 1 illustrates an exemplary system 9 in which the present methods 20, 30, 40, 50, 60, 70 are employed. The system 9 comprises a satellite 10, payload test earth stations 18, and telemetry and command earth station 19. The satellite 10 comprises transponders 11, receive antennas 12, and transmit antennas 13 that are to be tested. The payload test earth stations 18 and telemetry and command earth station 19 are at geographically separate and distinct locations. The exemplary system 9 is used in conjunction with various methods 20, 30, 40, 50, 60, 70 in accordance with the principles of the present invention to provide for testing of the transponders 11 and antennas 12, 13.

The present systems 9 and methods 20, 30, 40, 50, 60, 70 provide for an improvements over the technique used with regard to NSTARa and NSTARb satellites deployed by the assignee of the present invention. The present systems 9 and methods 20, 30, 40, 50, 60, 70 also provide improvements over the teachings of U.S. Pat. No. 6,157,817. The contents of U.S. Pat. No. 6,157,817 are incorporated herein by reference in its entirety.

FIG. 2 is a flow diagram that illustrates a first exemplary procedure or method 20 in accordance with the present invention that is employed in conjunction with the system 9 shown in FIG. 1. The method 20 generates receive antenna pattern measurements that verify operation of the receive antenna 12 on the satellite 10. The steps of the exemplary receive antenna pattern measurement method 20 are as follows.

A receive antenna pattern is positioned 21 over a payload test earth station 18. This position is the start point for the subsequent slew and typically is the edge of the pattern. An RF test signal is uplinked 22 from a payload test earth station 18, to a receive antenna 12 on the satellite 10.

Commands 16 are uplinked 23 to the satellite 10 from a telemetry and command earth station 19 that cause a slow constant attitude translation (slewing) over predetermined orientation angles. The power level of the uplink test signal is sensed 24 in a transponder 11 on-board the satellite 10 while the satellite is slewed. Downlink telemetry 17 corresponding to the sensed power level and orientation angles is generated 25 on-board the satellite 10 and downlinked.

The downlink telemetry 17 is received 26 at a telemetry and command earth station 19 that is located at a geographically separate location from the payload test earth station 18. The sensed power level and orientation angles contained in the downlinked telemetry 17 are recorded and processed 27 to verify the operation of the receive antenna 12 on the satellite 10.

FIG. 3 is a flow diagram that illustrates a second exemplary method 30 that generates transmit antenna pattern measurements to verify operation of the transmit antenna 13. The purpose of the transmit antenna pattern measurement method 30 is to allow one earth station 18 to accurately map any of the transmit spot beams generated by the satellite 10 without using multiple payload test earth stations.

The second method 30 requires no uplink carrier, but the satellite transponder 11 must be able to generate enough noise to be received at the payload test earth station 18. This may be achieved by placing the transponder in automatic level control mode. An exemplary transmit antenna pattern measurement method 30 is as follows.

The gain of the transponder 11 is configured 31 to establish a suitable noise pedestal at the payload test earth station 18. The transmit antenna 13 pattern is positioned 32 over the payload test earth station 18. This position is the start point for the subsequent slew and typically is the edge of the pattern.

Commands 16 are uplinked 33 to the satellite 10 from a telemetry and command earth station 19 that cause a slow constant attitude translation (slewing) or discrete steps in attitude over predetermined orientation angles. Downlink noise 15 of the transponder 11 is transmitted 34 to the payload test earth station 18, where it is measured and recorded.

Downlink telemetry 17 corresponding to the orientation angles is generated 35 on-board the satellite 10 and transmitted 36 to a command and telemetry earth station 19. The noise power measurements and satellite attitude are recorded and processed 37 to verify the operation of the transmit antenna 13.

FIG. 4 is a flow diagram that illustrates a third exemplary method 40 that generates an input chain frequency response curve. The objective of this method is to verify the health of the input chain using signal strength telemetry. The input chain typically includes receive antenna feeds, input multiplexer, receiver, and channel amplifier. This method will verify all equipment up through the signal strength telemetry monitoring point, which is typically, but not necessarily, in the channel amplifier. The method 40 comprises the following steps.

An uplink beam 12 is positioned 41 over a payload test earth station 18 and the attitude of the satellite 10 is held stationary. An RF test signal at one of several selected frequencies of interest at a specified power level is uplinked 42 from the payload test earth station 18 to the satellite 10.

The signal strength of the uplink test signal is sensed 43 in the transponder 11 on-board the satellite 10. Downlink telemetry 17 corresponding to the signal strength is generated 44 on-board the satellite 10 and downlinked.

The downlinked signal strength telemetry 17 is received 45 at a telemetry and command earth station 19. The signal strength telemetry 17 and RF test carrier frequency is recorded 46.

The above steps (42-43) are repeated 47 until all frequencies of interest are uplinked and signal strength telemetry is recorded 46. The recorded signal strength telemetry and RF test carrier frequency are processed 48 to produce the input chain frequency response curve.

FIG. 5 is a flow diagram that illustrates a fourth exemplary method 50 that generates an input chain transfer curve. The objective of this method 50 is to verify the health of the input chain using signal strength telemetry. The input chain typically includes receive antenna feeds, input multiplexer, receiver, and channel amplifier. This method 50 verifies all equipment up through the signal strength telemetry monitoring point, which is typically, but not necessarily, in the channel amplifier. The method 50 comprises the following steps.

An uplink beam 12 is positioned 51 over an earth station 18 and the attitude of the satellite 10 is held stationary. An RF test signal at one of several power levels of interest at a specified frequency is uplinked 52 from the payload test earth station 18 to the satellite 10.

The signal strength of the uplink test signal is sensed 53 in the transponder 11 on-board the satellite 10. Downlink telemetry 17 corresponding to the signal strength is generated 54 on-board the satellite 10 and downlinked.

The downlinked signal strength telemetry 17 is received 55 at a telemetry and command earth station 19. The signal strength telemetry 17 and RF test carrier power level are recorded 56. This is repeated until all power levels of interest are uplinked and signal strength is recorded. The recorded signal strength telemetry and RF test carrier power level are processed 57 to produce the input power transfer curve.

FIG. 6 is a flow diagram that illustrates a fifth exemplary method 60 that generates an output chain frequency response curve. The objective of this method is to verify the health of the output chain using downlink noise power. No uplink is required. The output chain includes typically includes high power amplifier (traveling wave tube (TWT) or solid state power amplifier (SSPA), filter, output multiplexer, transmit antenna feeds. The method 60 comprises the following steps.

A downlink beam 13 is positioned 61 over an earth station 18 and the attitude of the satellite 10 is held stationary. The downlink noise power 15 within a small bandwidth centered around a selected frequency of interest is measured 62 at the earth station 18.

The noise power measurements are continued 63 until the noise power at all frequencies of interest are measured. The recorded noise power measurements are processed 64 at the earth station 18 to generate an output chain frequency response curve.

FIG. 7 is a flow diagram that illustrates a sixth exemplary method 70 that generates a power level measurement of the transponder. The objective of this method is to verify the health of the output chain using downlink noise power. No uplink is required. The output chain includes typically includes high power amplifier (traveling wave tube (TWT) or solid state power amplifier (SSPA), filter, output multiplexer, transmit antenna feeds. The method 70 comprises the following steps.

A downlink beam 13 is positioned 71 over an earth station 18 and the attitude of the satellite 10 is held stationary. The downlink noise power 15 within a small bandwidth at the center frequency is measured 72 at the earth station 18. These steps are repeated 73 for a variety of gain steps, if the satellite is equipped with commandable gain steps.

Thus, various methods for testing in-orbit multibeam satellite communication systems using input power telemetry and output noise power been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method of testing a satellite receive antenna of a multibeam satellite system, comprising the steps of:
uplinking a test signal from a payload test earth station to the receive antenna;
slewing the satellite over orientation angles using a slow constant attitude translation;
sensing a power level of the test signal on-board the satellite during slewing;

transmitting downlink telemetry comprising sensed power level and orientation angles of the satellite from the satellite to a telemetry and command earth station that is located at a geographically separate location from the payload test earth station; and processing the sensed power level and said orientation angles to verify the operation of said receive antenna on the satellite.

2. The method recited in claim 1 wherein an edge of a satellite receive beam is chosen as a start point for slewing.

3. A method of testing a satellite receive antenna of a multibeam satellite system, comprising the steps of:

uplinking a test signal from a payload test earth station to the receive antenna;

slewing the satellite over orientation angles using a slow constant rate attitude translation;

sensing a power level of the test signal on-board the satellite during slewing;

transmitting downlink telemetry comprising sensed power level and orientation angles of the satellite from the satellite to a telemetry and command earth station that is located at a geographically separate location from the payload test earth station; and processing the sensed power level and said orientation angles to verify the operation of said receive antenna on the satellite.

4. The method recited in claim 3 wherein an edge of a satellite receive beam is chosen as a start point for slewing.

5. A method of testing a satellite receive antenna of a multibeam satellite system, comprising the steps of:

uplinking a test signal from a first earth station to the receive antenna;

slewing the satellite over orientation angles using a slow constant rate attitude translation;

sensing a power level of the test signal on-board the satellite during slewing;

transmitting downlink telemetry comprising sensed power level and orientation angles of the satellite from the satellite to a second earth station that is located at a geographically separate location from the first earth station; and processing the sensed power level and said orientation angles to verify the operation of said receive antenna on the satellite.

6. The method recited in claim 5 wherein an edge of a satellite receive beam is chosen as a start point for slewing.

* * * * *